United States Patent
Mootz et al.

(10) Patent No.: US 7,241,060 B2
(45) Date of Patent: Jul. 10, 2007

(54) SELF LEVELING CAMERA SUPPORT APPARATUS

(76) Inventors: Jeffery Scott Mootz, 303 Valley Green Sq., Lesueur, MN (US) 56058; Denis Daryl Shoemaker, 31194 490th St., Kasota, MN (US) 56050

( * ) Notice: Subject to any disclaimer, the term of this patent is extended or adjusted under 35 U.S.C. 154(b) by 179 days.

(21) Appl. No.: 10/905,666

(22) Filed: Jan. 14, 2005

(65) Prior Publication Data

US 2005/0196163 A1 Sep. 8, 2005

Related U.S. Application Data

(63) Continuation-in-part of application No. 10/708,438, filed on Mar. 3, 2004, now Pat. No. 7,090,416.

(51) Int. Cl.
*G03B 17/00* (2006.01)
*H04N 5/225* (2006.01)
*F16M 11/04* (2006.01)

(52) U.S. Cl. .............. 396/421; 396/428; 348/373; 248/187.1

(58) Field of Classification Search ............. 396/12, 396/13, 419, 421, 428; 348/373, 375; 352/243; 248/187.1, 180.1
See application file for complete search history.

(56) References Cited

U.S. PATENT DOCUMENTS

| | | | |
|---|---|---|---|
| 3,467,350 A * | 9/1969 | Nelson | 248/636 |
| 3,632,076 A | 1/1972 | Rogers, Jr. | 248/371 |
| 4,247,069 A | 1/1981 | Kurz | 248/185 |
| 4,645,320 A | 2/1987 | Muelling et al. | 354/81 |
| 5,190,256 A * | 3/1993 | Macchiarella | 248/177.1 |
| 5,243,370 A | 9/1993 | Slater | 352/243 |
| 5,742,859 A | 4/1998 | Acker | 396/419 |
| 5,897,223 A | 4/1999 | Tritchew et al. | 396/13 |
| 5,940,644 A | 8/1999 | Putora | 396/421 |
| 5,963,749 A | 10/1999 | Nicholson | 396/421 |
| 2003/0007795 A1 | 1/2003 | Grober | 396/55 |
| 2004/0223078 A1* | 11/2004 | Zadok | 348/375 |

OTHER PUBLICATIONS

Melton International Tackle, Custom Camera Mount, meltontackle website.
TRAKKER ™, Video Camera Mount, Overtons catalog p. 23 and tgoemail website.
Birdsall Marine, Video Mount, birdsallmarine website.

* cited by examiner

*Primary Examiner*—W. B. Perkey
*Assistant Examiner*—Rishi S. Suthar
(74) *Attorney, Agent, or Firm*—Roger A. Jackson (57) ABSTRACT

A self leveling camera support apparatus and method for helping isolate a camera from rolling motion of a support structure. The apparatus includes a frame having a first end adapted to attach to the support structure and a second end with a pivotal connection. Also included, is a roll member adapted to attach the camera, the roll member is pivotally attached to the pivotal connection at an extension arm proximal end portion, the roll member also includes an extension arm distal end portion adjacent to support fingers for a camera mount. The roll member is operational to help the camera level from roll movement of the frame, resulting from a center of mass of the roll member, camera, and extension arm combined, the center of mass positioned between the pivotal connection and the frame first end, wherein the frame and the extension arm form a parallel to angular relationship.

16 Claims, 6 Drawing Sheets

SELF LEVELING CAMERA SUPPORT APPARATUS

RELATED APPLICATION

This is a continuation in part application of U.S. patent application Ser. No. 10/708,438 filed Mar. 3, 2004 now U.S. Pat. No. 7,090,416 by Jeffery Scott Mootz and Denis Daryl Shoemaker.

TECHNICAL FIELD

This invention relates generally to camera movement stabilizing devices and apparatus and more particularly to support mounting apparatus for helping to stabilize a camera mounted on a marine vessel from rolling movement, with rolling movement being defined as along an axis that is substantially parallel to the camera's lens line of sight axis.

BACKGROUND OF INVENTION

There exists a need to minimize unwanted camera motion, which tends to occur when the structure that the camera is mounted to has motion that is inherent in the particular location or application that the desired camera shot is wanted, such as in the case of mounting a camera to a marine vessel that at the very least has rolling motion from waves, wind, and the like. This problem is well recognized in the prior art with a number of complex to simple solutions in existence. The solutions exist either within the camera itself and/or are in the camera support or mounting apparatus. The typical complex solution to the aforementioned problem is with the use of either a gyroscopic mount or the use of a gimbal bearing(s) that allows multi axis movement that is typically termed; roll, pitch, and yaw of a portion of the camera mount that is affixed to for instance, the marine vessel while helping to stabilize the other portion of the camera mount so that the camera keeps a true orientation to the horizon or a selected position with minimal unwanted movement. There are additional enhancements to either the gyroscopic mount or to the gimbal bearing for computer control to help maintain a desired orientation of the camera. Simpler prior art solutions would involve a pendulum mount type of arrangement having single axis or multiple axis capabilities with a counterweight to help maintain the camera orientation to the horizon with movement of the non pendulum portion of the camera mount.

An example of a complex prior art solution would be in U.S. Pat. No. 5,897,223 to Tritchew et al. that is a stabilizing platform system for a camera that helps isolate the camera from multiple axis motion being about the roll, pitch, and yaw axes including a passive vibration isolator, this is accomplished by the use of multiple gimbal bearings and dampened coil springs, or optionally multiple magnetic torque motors for controlling positioning force against the gimbal bearing(s). Tritchew et al. would be considered a high end type of camera stabilizing apparatus by having control over multiple axes of undesired camera movement, a vibration isolator, and the ability to control camera movement. A further example of a complex part solution would be in U.S. patent application Publication No. US 2003/0007795 A1 to Grober that is a stabilizing camera mount specifically designed to mount upon a buoy that is acted upon by a wave motion when the camera mount attempts to stabilize the camera's view in multiple axes and having remote control for relative camera positioning. Grober utilizes either an electronically stabilized device or a gimbal bearing.

An example of a simple prior art solution would be in U.S. Pat. No. 5,243,370 to Slater that is a camera stabilizer using counterweights on an extension beam that utilizes the inertia of the weights to stabilize the camera's position, with each weight covering one single axis of motion that is typically undampened and would have no relative position control of the camera on the part of the camera operator. Slater, while appealing for its simplicity unfortunately has drawbacks in that the counterweights add weight to the stabilizer while the extension arms add bulk to the stabilizer, making the stabilizer unwieldy to handle. A further example of a simple prior art solution would be in U.S. Pat. No. 5,742,859 to Acker that discloses a camera support and stabilizing device by again using counterweights on extension arms to allow for a stable positioning of the camera relative to movement of the base support. Acker has some further refinements in being able to adjust the extension arm and counterweight location relative to the camera.

An example of an intermediate complexity prior art solution would be in U.S. Pat. No. 4,645,320 to Muelling et al. that is a camera mount for a motor vehicle that utilizes a pendulum on a stand with a gimbal bearing between the pendulum and the stand with the camera mounted on the pendulum and the interaction between the pendulum and the stand controlled by springs and dampening elements, with the springs controlling the relative position of the camera to the motor vehicle position.

There exists a need for a camera support apparatus by providing at least an automatically leveling assistance on a camera roll axis with a degree of dampening control on the cameras corrective movement that is not especially complex, large, heavy, or expensive for a camera operator to use.

SUMMARY OF INVENTION

The present invention of a self leveling camera support apparatus for helping isolate a camera from a rolling axis motion of a support structure broadly includes, a frame having a longitudinal axis, the frame including a first end that is adapted to attach to a support structure and a second end that forms a pivotal connection having a pivotal roll axis. Also included is a roll member that is adapted to attach to the camera, the roll member includes a pivotal attachment to the pivotal connection by a pivotal shaft, being operational to pivot parallel to the pivotal roll axis. The roll member also includes an extension arm having a longitudinal axis, the extension arm including a proximal end portion that is adjacent to the pivotal attachment, the extension arm longitudinal axis being positioned approximately perpendicular to the pivotal roll axis. The extension arm also including a distal end portion that is adjacent to a camera mount, the roll member is operational to help maintain the camera positional orientation level in relation to arbitrary pivotal roll movement of the frame. This results from a selectively positioned center of mass of the roll member, camera, and extension arm, combined, with the center of mass being positioned between the pivotal roll axis and the frame first end. Wherein the frame longitudinal axis and the extension arm longitudinal axis form a parallel to angular relationship.

These and other objects of the present invention will become more readily appreciated and understood from a consideration of the following detailed description of the exemplary embodiment(s) of the present invention when taken together with the accompanying drawings, in which;

REFERENCE NUMBER IN DRAWINGS

22 Self leveling camera support apparatus assembly
24 Camera
25 Marine vessel
26 Frame first end
28 Support structure in the form of a marine vessel railing
29 Marine vessel rail outside circumference
30 Pivotal roll axis
31 Rolling axis motion of support structure or frame arbitrary pivotal roll movement
32 Horizon, either water horizon, or land horizon, or land shoreline
34 Water surface
36 Shoreline
38 Pivotal roll axis bearings
40 Camera mount pad
41 Camera mount securing device
42 Camera mount screw
43 Extension arm distal end portion
44 Extension arm distal end portion support fingers for camera mount pad
45 Extension arm proximal end portion
46 Extension arm
47 Extension arm longitudinal axis
48 Frame second end pivotal connection on the non dampener side
49 Frame longitudinal axis
50 Frame
51 Frame second end
52 Roll member
53 Frame second end pivotal connection on dampener side
54 Roll member pivotal shaft
55 Roll member pivotal shaft outside diameter
56 Marine vessel rail clamp arcuate section
58 Marine vessel rail clamp pivotal element
59 Marine vessel rail clamp pivotal element pivot
60 Marine vessel rail clamp fastener
61 Roll angle between frame longitudinal axis and extension arm longitudinal
62 Attachment means between extension arm proximal end portion and pivotal shaft
63 Support structure angle in relation to horizon
64 Dampener assembly
65 Means for selectable spring compression
66 Dampener friction disc
67 Dampener spring
68 Dampener adjustment knob
69 Dampener adjustment knob shoulder
70 Dampener adjustment knob spring pilot
71 Dampener fiction disc inside diameter
72 Dampener friction disc face
74 Roll axis bearing stationary face
75 Dampener adjustment knob spring pilot internal thread
76 Pivotal shaft threaded end portion
77 Spring axial compression
78 Knob turning rotation
79 Pivotal shaft rotation
80 Frame first end selected rotational position
90 Selected center of mass position of roll member, camera, and extension all combined
92 Frame second end rotational aperture
93 Frame second end rotational aperture clamping fasteners
94 Frame first end rotational aperture
95 Frame first end rotational aperture split line
96 Frame selected rotational position
97 Frame first end rotational aperture clamping fasteners
98 Extension arm angled portion

DETAILED DESCRIPTION

Figure 1:
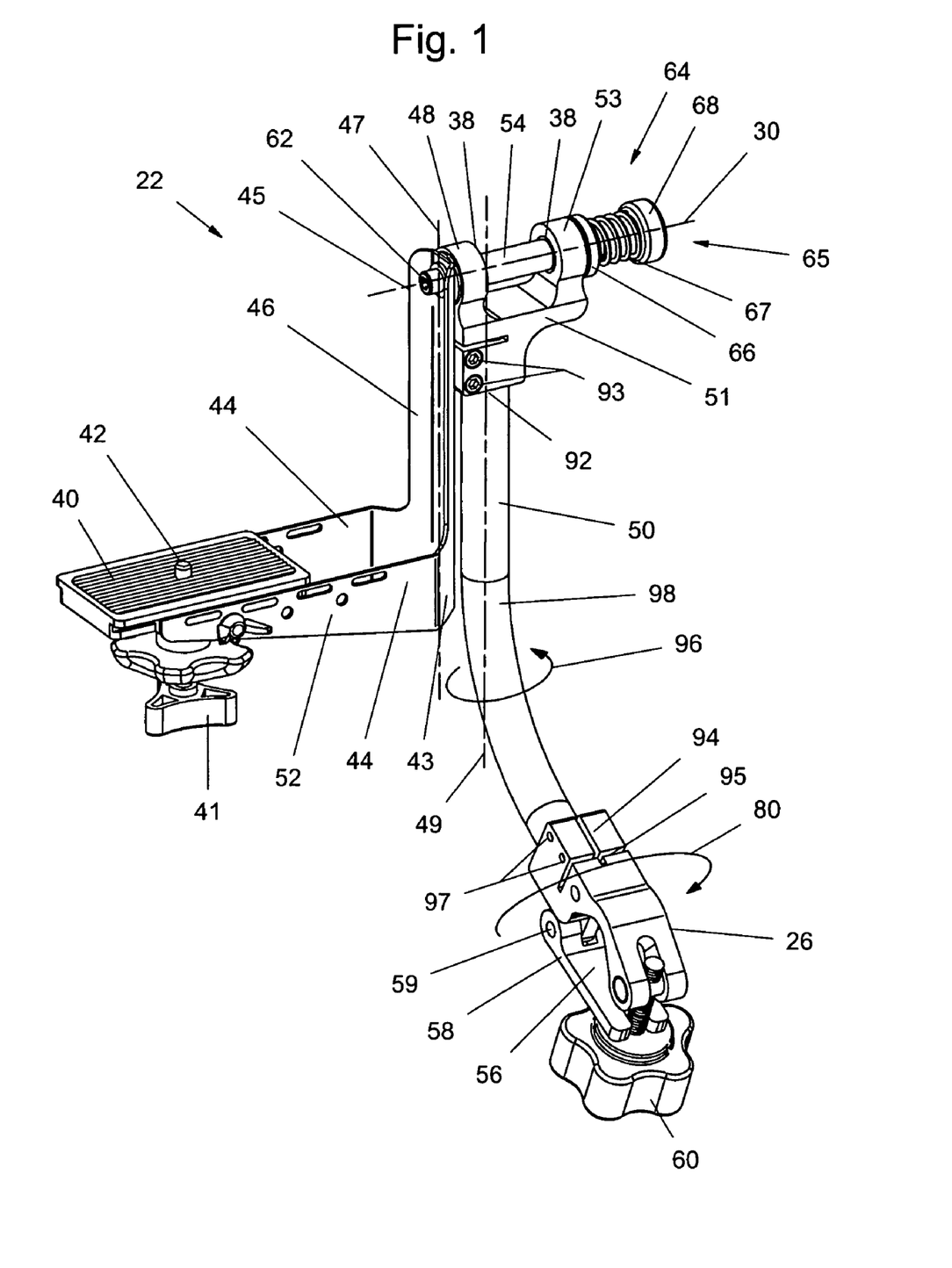
FIG. 1 shows a perspective view of the self leveling camera support apparatus assembly with the frame first end rotated away from the camera mount.
Figure 2:
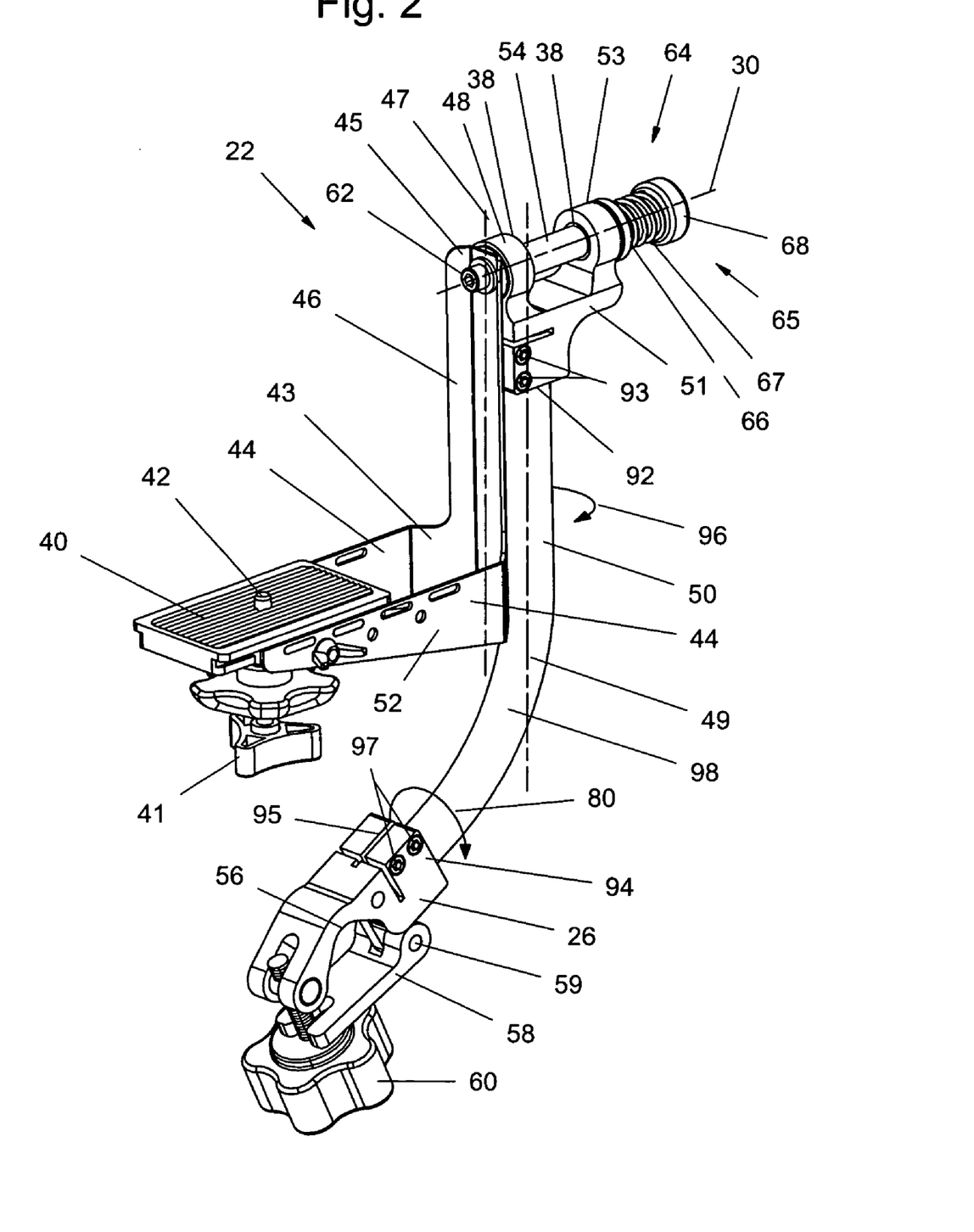
FIG. 2 shows a perspective view of the self leveling camera support apparatus assembly with the frame first end rotated toward the camera mount.
Figure 3:
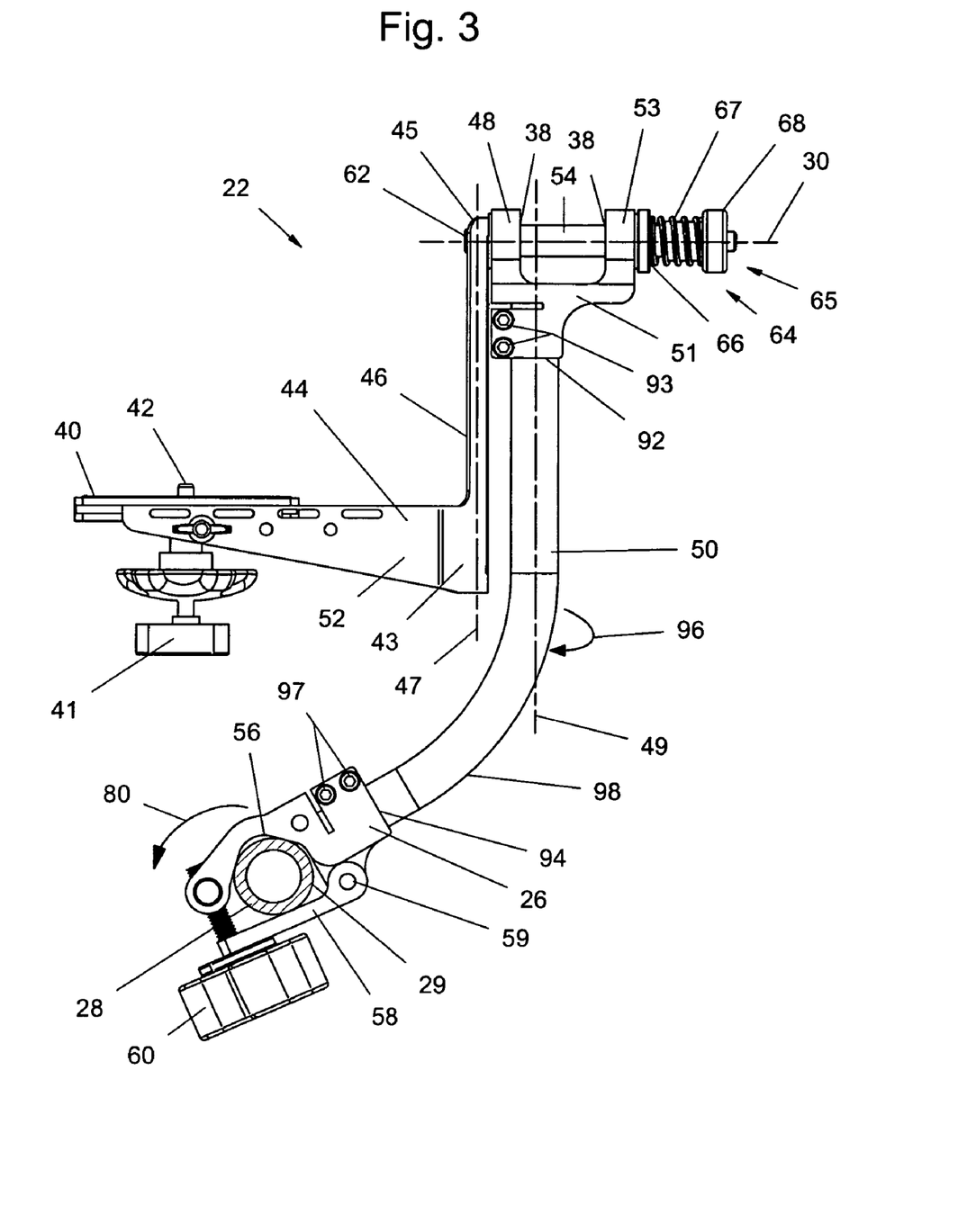
FIG. 3 shows a side view of the self leveling camera support apparatus assembly with the frame first end rotated toward the camera mount.
Figure 4:
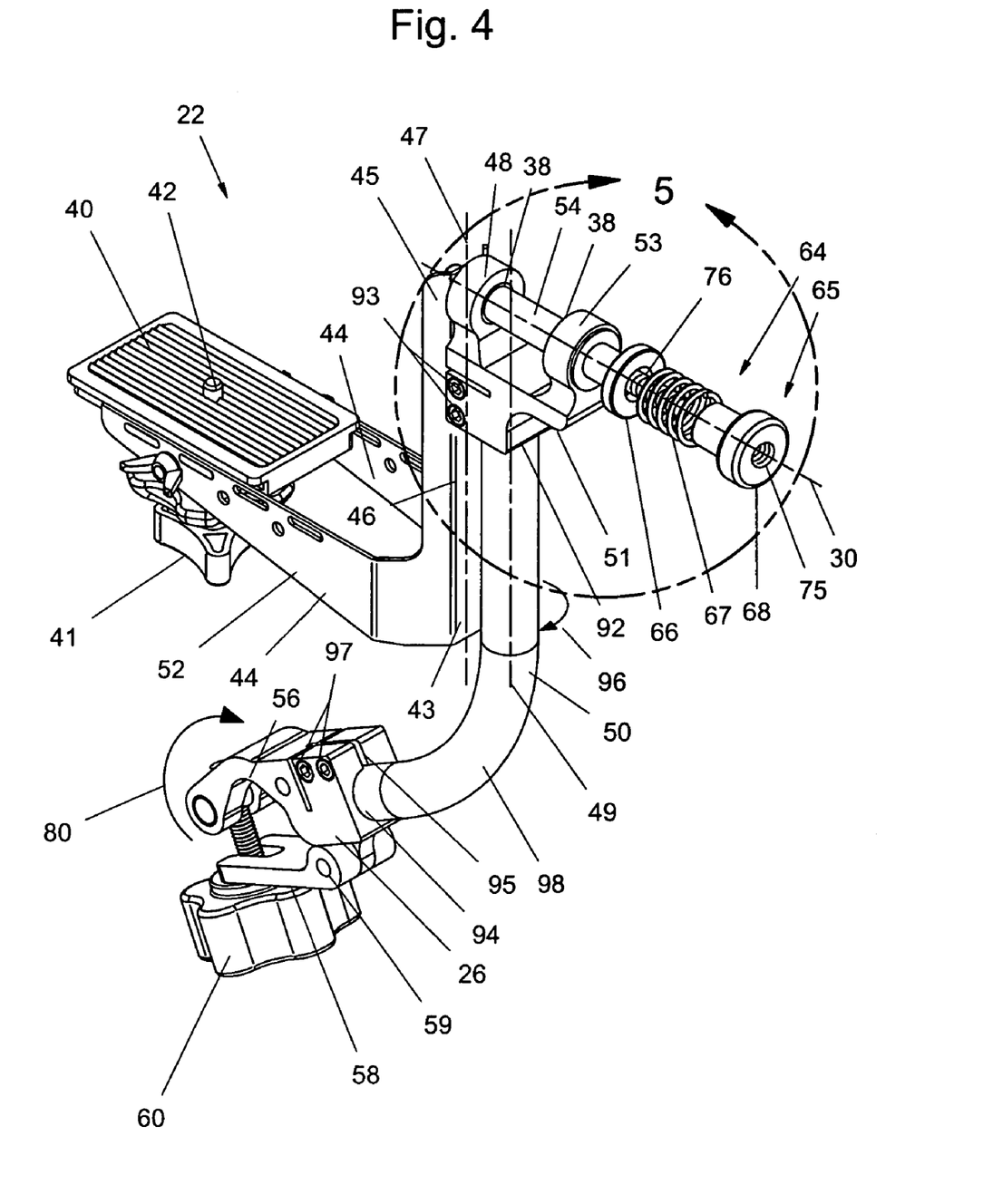
FIG. 4 shows a perspective view from the side opposite of the camera mount of the self leveling camera support apparatus assembly showing the dampener assembly with the frame first end rotated toward the camera mount.
Figure 5:
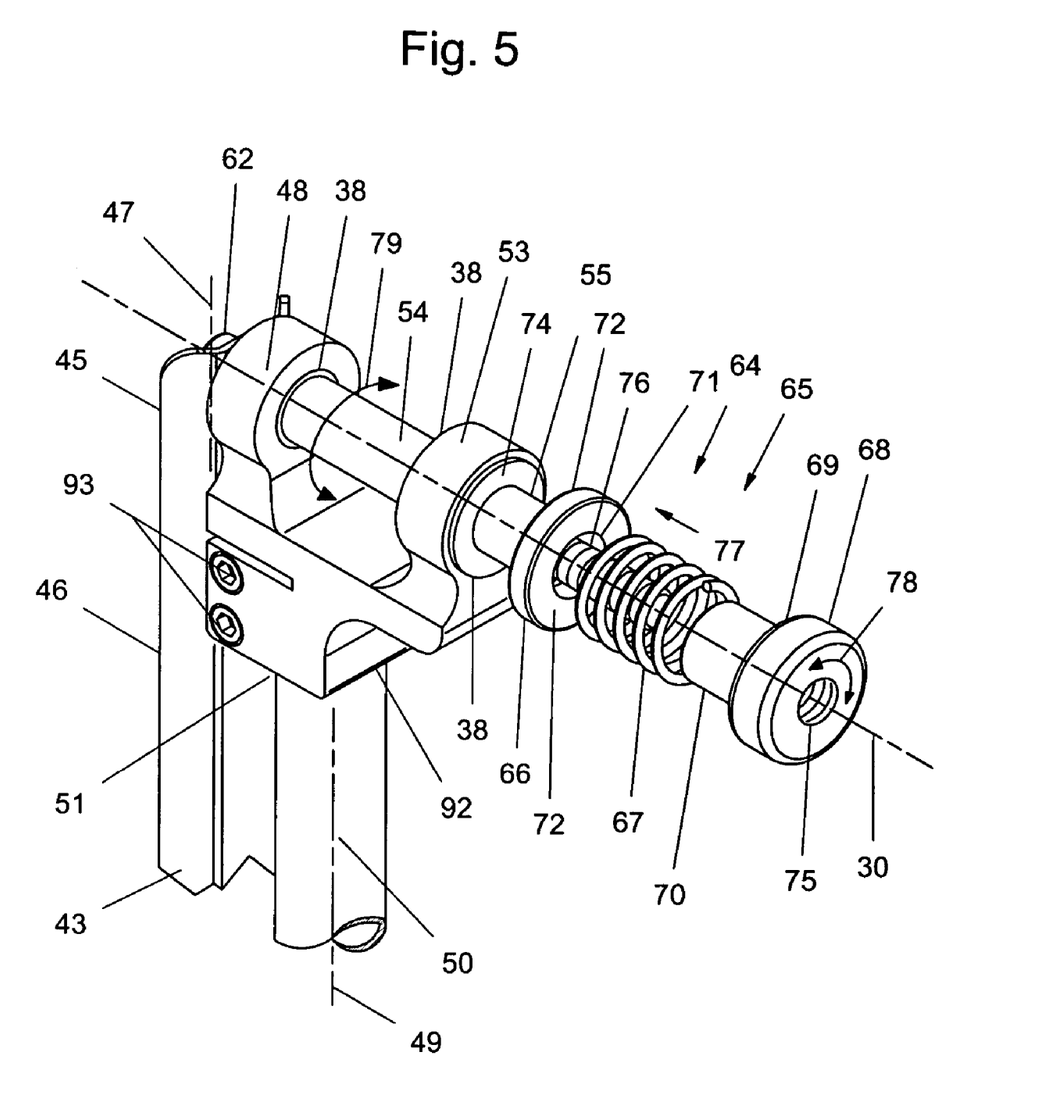
FIG. 5 shows an expanded perspective of view 5 from FIG. 4 specifically of the dampener assembly.
Figure 6:
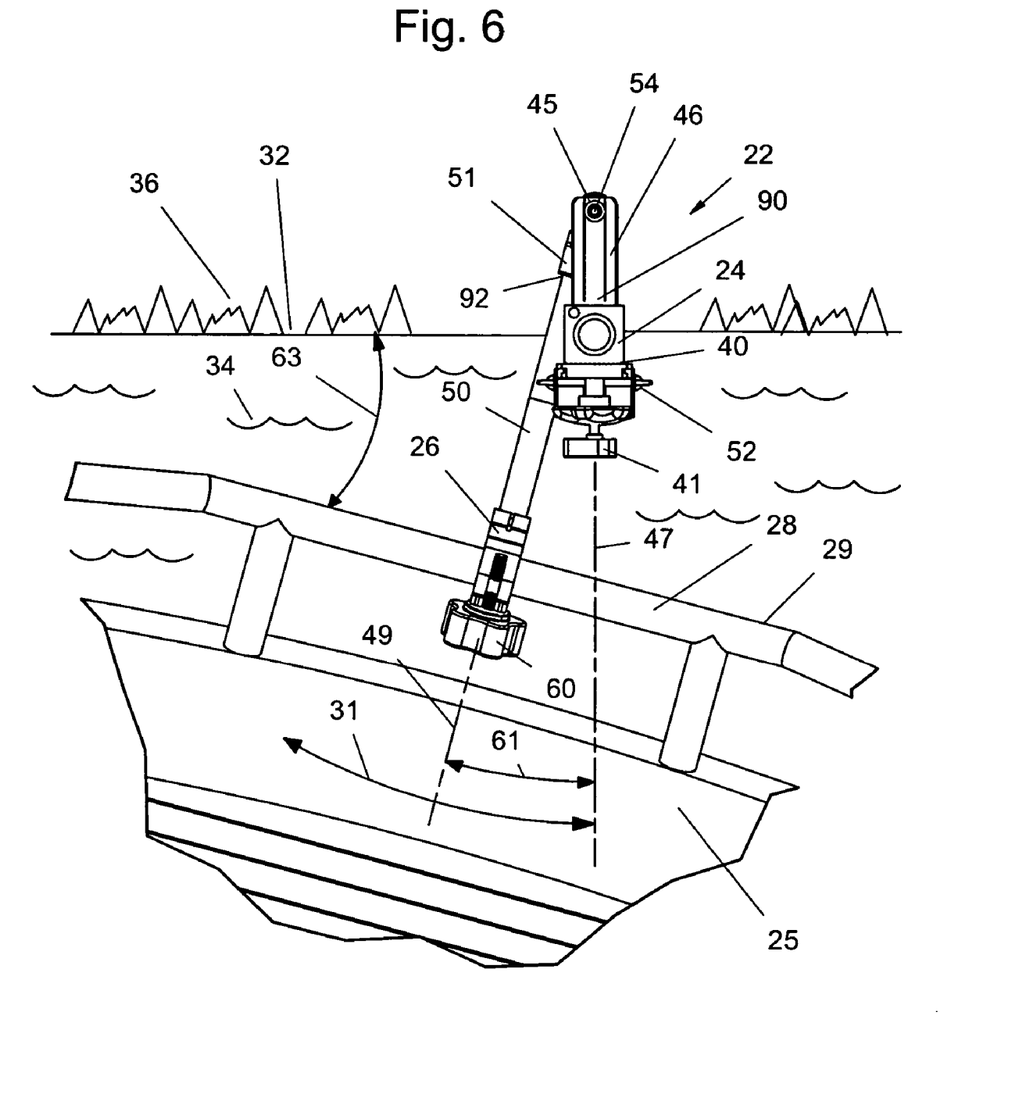
FIG. 6 shows a perspective use view of the self leveling camera support apparatus assembly mounted on a marine vessel railing angled in relation to the horizon.

With reference to FIGS. 1 through 6, wherein FIG. 1 shows a perspective view of the self leveling camera 24 support apparatus assembly 22 with the frame 50 first end 26 rotated 96 away from the camera 24 mount 40, FIG. 2 shows a perspective view of the self leveling camera 24 support apparatus assembly 22 with the frame 50 first end 26 rotated 96 toward the camera 24 mount 40, and FIG. 3 shows a side view of the self leveling camera 24 support apparatus assembly 22 with the frame 50 first end 26 rotated 96 toward the camera 24 mount 40. FIG. 4 shows a perspective view from the side opposite of the camera 24 mount 40 of the self leveling camera 24 support apparatus assembly 22 showing the dampener assembly 64 with the frame 50 first end 26 rotated 96 toward the camera 24 mount 40, FIG. 5 shows an expanded perspective of view 5 from FIG. 4 specifically of the dampener assembly 64, and FIG. 6 shows a perspective use view of the self leveling camera 24 support apparatus assembly 22 mounted on a marine vessel 25 railing 28 angled 63 in relation to the horizon 32.

Broadly, the present intention of a self leveling camera support apparatus 22 for helping isolate a camera 24 from a rolling axis motion 31 of a support structure 28 includes a frame 56 having a longitudinal axis 49, the frame includes a first end 26 that is adapted to attach to a support structure 28 and a frame second end 51 that includes a frame 50 second end 51 pivotal connection 48 on the non dampener 64 side and a frame 50 second end 51 pivotal connection 53 on the dampener 64 side that together form the pivotal connections 48 and 53 having a pivotal roll axis 30. The materials of construction for the frame 50 are preferably 303 stainless steel, however, the frame first end 26 is preferably constructed of 6061 aluminum, alternatively for the frame 50 and the frame first end 26 aluminum, plastics, or composites could be used that are suitable for a marine application. Also included is a roll member 52 that is adapted to attach to the camera 24, using a standard one quarter (¼) inch screw 42 fastener in conjunction with a conventional camera 24 mount securing device 41 on a camera 24 mount pad 40, however, other mounting configurations could be used depending upon the specific camera 24 that would be adequate to secure the camera 24 to the roll inrember 52. The roll member 52 is preferably constructed of 303 stainless steel, or arry other material suitable for a marine application.

The camera 24 mount pad 40 is preferably constructed of 6061 aluminum or any other alternative material suitable for a marine application. The camera 24 pad 40 is adjacent to extension arm 46 distal end portion 43 support fingers 44 that are in between the camera 24 mount pad 46 and the extension arm 46 distal end portion 43 as best shown in FIGS. 1–4. The roll member 52 is pivotally attached to the pivotal connections 48 and 53 by a pivotal shaft 54, with the roll member 52 being operational to pivot about the pivotal roll axis 30. The materials of construction for the shaft 54 are preferably 303 stainless steel or any other material suitable for the shaft 54 function in a marine application. Preferably, the interface between the pivotal connections 48 and 53 and the pivotal shaft 54 is accomplished by use of sleeve hearings 38 preferably manufactured by IGUS, part nunter-TFI-6869-08. Alternatively, the hearings 38 could by any type of sliding contact between the pivotal connections 48 and 53 and the pivotal shaft 54 that would accomplish the aforementioned pivotal movement and be suitable for a marine environment. The roll member 52 also includes an extension arm 46 having a longitudinal axis 47, the extension arm 46 including the proximal end portion 45 that is adjacent to the pivotal attachment being the pivotal connections 48 and 53 by a pivotal taft 54 to the frame second end 51. The extension arm 46 longitudinal axis 47 being positioned approximately perpendicular to the pivotal roll axis 30, with the extension arm 46 also including a distal end portion 43 that is adjacent to the fingers 44 that support the camera 24 mount 40.

The roll member 52 is operational to help maintain the camera 24 positional orientation level, for example to the horizon 32 in relation to arbitrary pivotal roll movement 31 of the frame 50, wherein the frame 50 is adapted to be attached to the support structure 28, with the support structure 28 and the frame 50 moving in a substantially like manner from the arbitrary pivotal roll movement 31. Thus, the roll member 52 is operational to help maintain the camera 24 positional orientation level, for example to the horizon 32 in relation to arbitrary pivotal roll movement 31 of the frame 50 resulting from a selectively positioned center of mass 90 of the roll member 52, camera 24, and extension arm 46, combined, with the center of mass 90 being positioned between the pivotal roll axis 30 and the frame 50 first end 26, wherein the frame longitudinal axis 49 and the extension arm 46 longitudinal axis 47 form a parallel to angular relationship depending upon the arbitrary pivotal roll movement 31 of the frame 50, wherein the frame 50 is adapted to be attached to the support structure 28. The typical camera 24 weight that is anticipated for the self leveling camera support apparatus 22 is about 0.5 pounds to 3.0 pounds, with the possibility that the camera weight 24 being more or less than this range for a particular application. The selectability of the center of mass 90 is adjustable by changing the length of the extension arm 46, with the extension arm 46 length being defined as the distance between the pivotal roll axis 30 and the camera mount 40 along the extension arm 46 longitudinal axis 47. Thus, for a heavier camera 24 the extension arm 46 length would tend to be shorter as the correcting moment about the pivotal roll axis 30 would be increased from the additional camera 24 weight and thus to compensate a shorter moment arm being a shorter extension arm 46 length would equate to a lower the correcting moment about the pivotal roll axis 30. Also, with a lighter camera 24 which would have a lower correcting moment about the pivotal roll axis 30 and longer extension arm 46 length would tend to be used to increase the correcting moment about the pivotal roll axis 30. Also, depending upon the aquatic conditions, such as wind, water surface waves, currents, and the like along with the marine vessel 25 orientation to the foregoing aquatic conditions, some trial and error may be done to set the length of the extension arm 46.

Moving in particular to the optional dampener assembly 64 that is positioned adjacent to both the frame 50 and the roll member 52, as best shown in FIGS. 1–4 and particularly in FIG. 5, with the dampener 64 being operational to help control or have a dampening effect on the relative arbitrary pivotal roll movement 31 of the frame 50 to the roll member 52. Preferably, the dampener 64 includes a friction disc 66 and a spring element 67, wherein broadly the control of relative movement between the friction disc 66, the spring 67, and the frame 50 results in control of the relative arbitrary pivotal roll movement 31 of the frame 50 to the roll member 52. Further, the dampener 64 spring 67 includes a means 65 for selectable spring 67 axial compression 77 against the disc 66 resulting in a selectable disc 66 friction against the frame 50, or in particular a stationary face 74 of the pivotal roll axis bearing 38. Thus, the dampener 64 being operational to further control the relative arbitrary pivotal roll movement 31 of the frame 50 to the roll member 52. The means 65 for selectable spring axial compression 77 against the disc 66 is preferably a manually adjustable knob 68 having an internal thread 75 that is threadably engaged to a threaded portion 76 of the pivotal shaft 54. The knob 68 can be constructed of any material suitable for a marine application. Alternative means 65 for selectable spring 67 axial compression 77 against the disc 66 would be acceptable also such as a spring loaded ball and groove arrangement, or a resilient frictional material between the knob 68 and the pivotal shaft 54, or any other functionally similar structures suitable for a marine environment. Thus, in operation to selectively adjust the frictional dampening resistance between the disc 66 face 72 and the pivotal roll axis bearing 38 face 74, the knob 68 is turned 78 either clockwise or counter clockwise to increase or decrease respectively the axial compression 77 upon the spring 67 thus increasing or decreasing respectively the axial contact force between the disc 66 face 72 and the pivotal bearing 38 face 74 and as is well known in the art the friction between the disc 66 face 72 and the pivotal bearing 38 face 74 is substantially a function of the coefficient of friction of the particular materials and the normal force which in this case is the axial compression 77. Thus, as the coefficients of friction of the disc 66 and face 74 are fixed, the frictional dampening is a function of the axial compression 77. The spring 67 is compressed axially 77 between the knob 68 shoulder 69 with the spring 67 piloting on the knob 68 spring pilot 70 and the spring 67 contacting the disc 66 face 72, as best shown in FIG. 5. Note that the disc 66 inside diameter 71 is a slip fit as against the outside diameter 55 of the pivotal shaft 54 thus ensuring control of the aforementioned normal force by the axial compression 77. The preferred materials of construction of the disc 66 are Delrin or Acetal or any close functional substitute suitable for a marine application. The spring 67 is preferably from Lee Spring Company Part Number LC-055J-6 or a functionally acceptable alternative suitable for a marine application.

Functionally, the dampener 64 threadable engagement between the knob 68 internal thread 75 and the threaded portion 76 of the pivotal shaft 54 is a semi locking thread or frictional thread by using a polygon type thread diametral configuration or an alternative type thread engagement that has the same frictional characteristics. As the roll member 52 moves in a pendulum type motion 31, transferring motion 31 into the limited pivotal shaft 54 rotation 79 by way of the roll member 52 extension arm 46 proximal end portion 45 being fastened to the pivotal shaft 54 with a attachment means 62 which is preferably a self locking nut suitable for marine use or any other acceptable alternative. Thus, this limited pivotal shaft 54 rotation 79 transfers this rotation 79 to the knob 68 which through the spring 67 axial compression 77 to the disc 66 rotates 79 the knob 68, the spring 67 and the disc 66, resulting in relative rotational movement between the disc 66 face 72 and the pivotal roll axis bearing 38 face 74, thereby creating the dampening friction between the disc 66 face 72 and the pivotal roll axis bearing 38 face 74. Hence, the need for the frictional threadable engagement between the knob 68 internal thread 75 and the threaded portion 76 of the pivotal shaft 54 to enable the transfer of the pivotal shaft 54 rotation 79 to the disc 66.

As an added optional further control of the dampening effect for the dampener 64, the spring element 67 can be sized and configured to have a selectable torsional spring rate, as is known in the art in units of inch-pounds per radian that is operational with the disc 66 to further control the relative arbitrary pivotal roll movement 31 of the frame 50 to the roll member 52. Functionally, as the aforementioned pivotal shaft 54 limited rotational movement 79 is transferred to the knob 68 shoulder 69 thus imparting limited rotational movement 79 into the spring 67 wherein the limited rotational movement 79 is arbitrary in magnitude, velocity, and acceleration and rotationally reacting through the selected torsional spring rate, rotationally decouples to some extent the limited rotational movement 79 from the relative movement of the disc 66 face 72 to the pivotal roll axis bearing 38 stationary face 74 thus ultimately allowing the camera 24 to substantially right itself to the horizon 32 prior to dampening action to take effect that slows down the righting movement of the camera 24 to the horizon 32 that stems from the arbitrary movement of the frame 50. In other words, what is created with the pivotal shaft 54 rotational movement 79 through the knob 68 shoulder 69 (with the pivotal shaft 54 and the knob 68 being substantially locked rotationally) with the rotational movement 79 transmitting into the spring 67 that subsequently transmits initially a portion of the rotational movement 79 into the disc 66 face 72 frictional contact with bearing 38 face 74 resulting in a torsional or rotational spring-dampener system that effectively decouples the disc 66 face 72 frictional contact with bearing 38 face 74 from the arbitrary pendulum type movement 31 of the roll member 52 allowing for more control of the overall dampening effect of the arbitrary pendulum type movement 31 of the roll member 52. The actual spring 67 torsional spring rates in inch-pounds per radian, coupled with coefficients of friction between the disc 66 face 72 frictional contact with bearing 38 face 74, and the axial compression 77 combine to make the three variables that can control the overall dampening effect. Thus setting the combination of these three variables is usually empirically determined based upon camera 24 size, weight, and type (video, still, etc.), extension arm 46 length, and the magnitude, velocity, and acceleration of the frame 50 arbitrary movement. Also, depending upon the aquatic conditions, such as wind, water surface waves, currents, and the like along with the marine vessel 25 orientation to the foregoing aquatic conditions, some trial and error based upon empirical conditions may be done to set the dampening effect to optimize the camera 24 images.

The dampener 64 performance is typically measured in; (force multiplied by time) divided by distance, or in English units (pound-seconds) per foot, which is adding movement resistance between the relative arbitrary pivotal roll movement 31 of the frame 50 to the roll member 52 with the effect of smoothing out the leveling correction of the camera 24 and minimizing an overshooting and/or pendulum effect of the leveling correction of the camera 24. The dampening resistance is a function of the weight of the camera 24 and the magnitude of the roll angle 61 being typically up to about forty five (45) degrees and the frequency (including velocity and acceleration) of the roll angle 61 changing. The desired range of dampening resistance is about 0.25 (pound-seconds) per foot to 2.0 (pound-seconds) per foot for an anticipated range, however, the dampening resistance could be more or less than this range depending upon the particulars of the camera 24 and the magnitude or roll angle 61 and the frequency of the roll angle 61 changing. Although several embodiments of the dampener 64 has been described, other types, materials, and configurations that are marine environment suitable could be utilized depending upon the particular application involving camera 24 weight and the selectively positioned center of mass 90 along with the magnitude or roll angle 61 and the frequency of the roll angle 61 changing in use for the self leveling camera 24 support apparatus 22 assembly.

Returning to the frame 50, particularly FIGS. 1–4, looking more specifically at the frame 50 that includes the first end 26 that is adapted to attach to the support structure 28 further includes an arcuate section 56 configured to substantially conform to a portion of a marine vessel rail 28 outside circumference 29 (see FIGS. 3 and 6), a rail clamp pivotal element 58 that is pivotally attached 59 to the frame first end 26, and a rail clamp fastener 60, wherein the aforementioned frame first end 26 added elements are operational to removably attach the frame 50 to a marine vessel rail 28 by clamping upon the marine vessel rail 28 outside circumference 29 (see FIG. 3). The frame first end 26 is preferably constructed of 6061 aluminum or any other alternative material suitable for a marine application. The typical size or outside diameter of the marine vessel rail 28 is from about seven eighths (⅞) of an inch to one inch and one eighths (1⅛) of an inch, however, larger or smaller marine vessel railing 28 diameters could be accommodated by the frame 50 first end 26 if required. Also, the support structure 28 could be something other than a marine vessel railing 28 also if required wherein the frame 50 first end 26 could be adapted to attach to another type of support structure.

Further, on the frame 50 that includes the frame second end 51 optionally is a fixably adjustable element that includes a frame second end 51 rotational aperture 92 that allows the frame 50 to rotate 96 and through the frame 50 angled portion 98 resulting in the frame first end 26 to selectively deviate from being approximately perpendicular to the pivotal roll axis 30, (see the difference between FIGS. 1 and 2). Wherein the frame 50 is approximately perpendicular to the pivotal roll axis 30 in FIG. 1 and the frame 50 is selectively deviated from being approximately perpendicular to the pivotal roll axis 30 in FIG. 2 by way of frame rotational movement 96 in the frame second end 51 rotational aperture 92. The frame second end 51 is preferably constructed of 6061 aluminum or any other alternative material suitable for a marine application. Also, fasteners 93 act to clamp the rotational aperture 92 to the frame 50 (using a split line (not shown) similar to split line 95 on the below mentioned frame first end 26) to fix the selected position that deviates from being approximately perpendicular to the pivotal roll axis 30. Operationally, the frame rotational movement 96 in the frame second end 51 rotational aperture 92 accommodates a support structure 28 of various positions. Further, optionally the frame first end 26 includes a fixedly adjustable element that includes the frame first end 26 rotational aperture 94 in conjunction with a frame first end 26 rotational aperture split line 95 and fasteners 97 that further allow a selected position of the frame first end 26 to accommodate the support structure 28 of various positions. Operationally, the frame first end 26 rotational aperture 94 split line 95 and fasteners 97 allow the frame first end 26 to rotate 80 to a selected position and be fixed in the selected position utilizing the clamping of the rotational aperture 94 on the frame 50 using the split line 95 and fasteners 97. The fasteners including but not limited to 93 and 97 are preferably constructed of 316 stainless steel or any other acceptable alternative material for a marine application.

METHOD OF USE

Referring in particular to FIG. 6, and FIGS. 1–5 for the structure referred to in the self leveling camera 24 support apparatus 22 assembly, disclosed is a method of acquiring camera 24 images of an aquatic event, comprising the step (a) of firstly providing a self leveling camera support apparatus 22 that includes a frame 50 having a longitudinal axis 49, with the frame 50 including a first end 26 that is adapted to attach to a support structure 28 and a frame second end 51 that includes a frame second end pivotal connection 48 on the non dampener 64 side and a frame second end 51 pivotal connection 53 on the dampener 64 side that together form a pivotal connection 48 and 53 having a pivotal roll axis 30. Also provided is a roll member 52 adapted to attach to a camera 24, with the roll member 52 being pivotally attached to the pivotal connections 48 and 53, with the roll member 52 being operational to pivot about the pivotal roll axis 30. The roll member 52 also includes an extension arm 46 having a longitudinal axis 47, the extension arm 46 includes a proximal end portion 45 that is adjacent to the pivotal attachments 48 and 53. The extension arm 46 longitudinal axis 47 being positioned approximately perpendicular to the pivotal roll axis 30, with the extension arm 46 also including a distal end portion 43 that is adjacent to the camera mount 40. The roll member 52 is operational to help maintain the camera 24 positional orientation level in relation to the arbitrary pivotal roll movement 31 of the frame 50, resulting from a selectively positioned center of mass 90 of the roll member 52, camera 24, and extension arm 46, combined, with the center of mass 90 being positioned between the pivotal roll axis 30 and the frame first end 26, wherein the frame 50 longitudinal axis 49 and the extension arm 46 longitudinal axis 47 form a parallel to angular relationship (see movement 31 and angle 61 in FIG. 6). In addition, a dampener 64 is included that is positioned adjacent to both the frame 50 and the roll member 52. The dampener 64 includes the friction disc 66 and the spring element 67, wherein the spring element 67 includes a means 65 for selectable spring axial compression 77 against the disc 66 resulting in selectable disc 66 friction against the frame 50. The spring element 67 is also sized and configured to have a selectable torsional spring rate that is operational with the disc 66 to further control a relative arbitrary pivotal roll movement 31 of the frame 50 to the roll member 52.

A further step (b) is in attaching the frame 50 first end 26 to the support structure 28, which is preferably in the form of a marine vessel railing 28 as best shown in FIG. 3. In attaching the frame 50 first end 26 to the marine vessel railing 28, the rail clamp arcuate section 56 is placed against the marine vessel railing 28 outside circumference 29 with the rail clamp pivotal element 58 retracted away from the outside circumference 29 via the rail clamp pivotal element 58 pivot 59. Then pivoting rail clamp pivotal element 58 toward the outside circumference 29 and securing the rail clamp pivotal element to the rail clamp arcuate section 56 using the rail clamp fastener 60. Note, that in FIG. 6 the self leveling camera 24 support apparatus 22 assembly is mounted on the marine vessel railing 28 with the camera 24 facing the inside or deck side of the marine vessel 25, however, mounting the self leveling camera 24 support apparatus 22 assembly in an opposite manner in relation to the marine vessel railing 28, such that the camera 24 would face the water surface 34 side would be acceptable also. A yet further step (c) is in attaching the camera 24 to the roll member 52, by securing the camera 24 to the mounting pad 40 preferably by use of the mount screw 42 by hand tightening a camera 24 mount securing device 41, as is well known in the art. The positioning of the camera 24 is to fix the pan positioning and facing the camera 24 line of sight axis generally parallel to the pivotal roll axis 30.

A further step (d) is in adjusting the dampener 64 means 65 for selectable spring axial compression 77 against the disc 66 to help facilitate appropriate relative movement 31 between the frame 50 and roll member 52 and to minimize the pendulum effect of the roll member 52 as previously described. A final step (e) is in acquiring the desired images from the camera 24 using the self leveling camera 24 support apparatus 22 assembly as is known in the art.

Optionally, step (d) can also include a further adjusting of the dampener 64 which includes selecting a spring element 67 that is sized and configured to have a desired torsional spring rate that is operational with the disc 66 to further control the relative arbitrary pivotal roll movement 31 of the frame 50 to the roll member 52 as previously described. Further, as an iterative process, step (d) of adjusting the dampener 64 means 65 for selectable spring 67 axial compression 77 against the disc 66 in conjunction with selecting a spring element 67 that is sized and configured to have a desired torsional spring rate and the step (e) of acquiring images of the aquatic event using the camera are sequentially repeated to improve the camera 24 images based upon empirical testing to improve the camera 24 images for a given set of conditions that include the actual spring 67 torsional spring rates in inch-pounds per radian, coupled with coefficients of friction between the disc 66 face 72 frictional contact with bearing 38 face 74, and the axial compression 77 combine to make the three variables that can control the overall dampening effect. Thus setting the combination of these three variables is usually empirically determined based upon camera 24 size, weight, and type (video, still, etc.), extension arm 46 length, and the magnitude, velocity, and acceleration of the frame 50 arbitrary movement 31. Also, depending upon the aquatic conditions, such as wind, water surface waves, currents, and the like along with the marine vessel 25 orientation to the foregoing aquatic conditions, some trial and error based upon empirical conditions may be done to set the dampening effect to optimize the camera 24 images as previously described. Also, optionally step (d) of adjusting the dampener 64 means 65 for selectable spring 67 axial compression 77 against the disc 66 and the step (e) of acquiring images of the aquatic event using the camera 24 can be sequentially repeated to improve the camera images based upon the aforementioned conditions for dampening effect.

CONCLUSION

Accordingly, the present invention of a self leveling camera support apparatus 22 has been described with some degree of particularity directed to the embodiment(s) of the present invention. It should be appreciated, though, that the present invention is defined by the following claims construed in light of the prior art so modifications or changes may be made to the exemplary embodiment(s) of the present invention without departing from the inventive concepts contained therein.

What is claimed is:

1. A self leveling camera support apparatus for helping isolate a camera from a rolling axis motion of a support structure, comprising:
    (a) a frame having a longitudinal axis, said frame including a first end that is adapted to attach to a support structure and a second end that forms a pivotal connection having a pivotal roll axis;
    (b) a roll member adapted to attach to the camera, said roll member including a pivotal attachment to said pivotal connection by a pivotal shaft, being operational to pivot about said pivotal roll axis, said roll member also includes an extension arm having a longitudinal axis, said extension arm including a proximal end portion that is adjacent to said pivotal attachment, said extension arm longitudinal axis being positioned approximately perpendicular to said pivotal roll axis, said extension arm also including a distal end portion that is adjacent to a camera mount, said roll member is operational to help maintain the camera positional orientation level in relation to arbitary pivotal roll movement of said frame, resulting from a selectively positioned center of mass of said roll member, camera, and extension arm, combined, with said center of mass being positioned between said pivotal roll axis and said frame first end, wherein said frame longitudinal axis and said extension arm longitudinal axis form a parallel to angular relationship; and
    c) a dampener that is positioned adjacent to both said frame and said roll member, wherein said dampener includes a friction disc and a spring element, wherein control of relative movement between said friction disc, said spring, and said frame is operational to help control relative arbitrary pivotal roll movement of said frame to said roll member.

2. A self leveling camera support apparatus according to claim 1 wherein said dampener spring element includes a means for selectable spring axial compression against said disc resulting in selectable disc friction against said frame, being operational to further control said relative arbitrary pivotal roll movement of said frame to said roll member.

3. A self leveling camera support apparatus according to claim 2 wherein said means for selectable spring axial compression against said disc is a manually adjustable knob that is threadably engaged to a threaded portion of said pivotal shaft.

4. A self leveling camera support apparatus according to claim 2 wherein said spring element is sized and configured to have a selectable torsional spring rate that is operational with said disc to further control said relative arbitrary pivotal roll movement of said frame to said roll member.

5. A self leveling camera support apparatus according to claim 1 wherein said frame first end that is adapted to attach to the support structure includes an arcuate section configured to substantially conform to a portion of a marine vessel rail outside circumference, a rail clamp pivotal element that is pivotally attached to said frame first end, and a rail clamp fastener, wherein said frame first end is operational to attach to a marine vessel rail.

6. A self leveling camera support apparatus according to claim 1 wherein said frame second end further comprises a fixably adjustable element that allows said frame first end to selectively deviate from being approximately perpendicular to said pivotal roll axis, wherein said frame second end fixably adjustable element is operational to accommodate a support structure of various positions.

7. A self leveling camera support apparatus according to claim 6 wherein said frame first end includes a fixedly adjustable element that allows a selected position of said frame first end to further accommodate said support structure of various positions.

8. A self leveling camera support apparatus for helping isolate a camera from a rolling axis motion of a support structure, comprising:
    (a) a frame having a longitudinal axis, said frame including a first end that is adapted to attach to a support structure and a second end that forms a pivotal connection having a pivotal roll axis;
    (b) a roll member adapted to attach to the camera, said roll member including a pivotal attachment to said pivotal connection by a pivotal shaft, being operational to pivot about said pivotal roll axis, said roll member also includes an extension arm having a longitudinal axis, said extension arm including a proximal end portion that is adjacent to said pivotal attachment, said extension arm longitudinal axis being positioned approximately perpendicular to said pivotal roll axis, said extension arm also including a distal end portion that is adjacent to a camera mount, said roll member is operational to help maintain the camera positional orientation level in relation to arbitary pivotal roll movement of said frame, resulting from a selectively positioned center of mass of said roll member, camera, and extension arm, combined, with said center of mass being positioned between said pivotal roll axis and said frame first end, wherein said frame longitudinal axis and said extension arm longitudinal axis form a parallel to angular relationship; and
    (c) a dampener that is positioned adjacent to both said frame and said roll member, said dampener includes a friction disc and a spring element, wherein said spring element includes a means for selectable spring axial compression against said disc resulting in selectable disc friction against said frame, said spring element is also sized and configured to have a selectable torsional spring rate that is operational with said disc to further control a relative arbitary pivotal roll movement of said frame to said roll member.

9. A self leveling camera support apparatus according to claim 8 wherein said means for selectable spring axial compression against said disc is a manually adjustable knob that is threadably engaged to a threaded portion of said pivotal shaft.

10. A self leveling camera support apparatus according to claim 8 wherein said frame first end that is adapted to attach to the support structure includes an arcuate section configured to substantially conform to a portion of a marine vessel rail outside circumference, a rail clamp pivotal element that is pivotally attached to said frame first end, and a rail clamp fastener, wherein said frame first end is operational to attach to a marine vessel rail.

11. A self leveling camera support apparatus according to claim 8 wherein said frame second end further comprises a fixably adjustable element that allows said frame first end to selectively deviate from being approximately perpendicular to said pivotal roll axis, wherein said frame second end fixably adjustable element is operational to accommodate a support structure of various positions.

12. A self leveling camera support apparatus according to claim 11 wherein said frame first end includes a fixedly adjustable element that allows a selected position of said frame first end to further accommodate said support structure of various positions.

13. A method of acquiring camera images of an aquatic event, comprising the steps of:
(a) providing a self leveling camera support apparatus that includes a frame having a longitudinal axis, said frame including a first end that is adapted to attach to a support structure and a second end that forms a pivotal connection having a pivotal roll axis, also included is a roll member adapted to attach to a camera, said roll member having a pivotal attachment to said pivotal connection by a pivotal shaft, being operational to pivot about said pivotal roll axis, said roll member also includes an extension arm having a longitudinal axis, said extension arm including a proximal end portion that is adjacent to said pivotal attachment, said extension arm longitudinal axis being positioned approximately perpendicular to said pivotal roll axis, said extension arm also including a distal end portion that is adjacent to a camera mount, said roll member is operational to help maintain the camera positional orientation level in relation to arbitrary pivotal roll movement of said frame, resulting from a selectively positioned center of mass of said roll member, camera, and extension arm, combined, with said center of mass being positioned between said pivotal roll axis and said frame first end, wherein said frame longitudinal axis and said extension arm longitudinal axis form a parallel to angular relationship, in addition a dampener is included that is positioned adjacent to both said frame and said roll member, said dampener includes a friction disc and a spring element, wherein said spring element includes a means for selectable spring axial compression against said disc resulting in selectable disc friction against said frame, said spring element is also sized and configured to have a selectable torsional spring rate that is operational with said disc to further control a relative arbitrary pivotal roll movement of said frame to said roll member;
(b) attaching said frame first end to the support structure;
(c) attaching the camera to said roll member;
(d) adjusting said dampener means for selectable spring axial compression against said disc to help facilitate appropriate relative movement between said frame and roll member and to minimize a pendulum effect of said roll member; and
(e) acquiring images of the aquatic event using the camera.

14. A method of acquiring camera images of an aquatic event according to claim 13 wherein said step (d) of adjusting said dampener means further includes selecting a spring element that is sized and configured to have a desired torsional spring rate that is operational with said disc to further control the relative arbitrary pivotal roll movement of said frame to said roll member.

15. A method of acquiring camera images of an aquatic event according to claim 14 wherein said step of (d) adjusting said dampener means for selectable spring axial compression against said disc in conjunction with selecting a spring element that is sized and configured to having a desired torsional spring rate and said step of (e) acquiring images of the aquatic event using the camera are sequentially repeated to improve the camera images.

16. A method of acquiring camera images of an aquatic event according to claim 13 wherein said step of (d) adjusting said dampener means for selectable spring axial compression against said disc and said step of (e) acquiring images of the aquatic event using the camera are sequentially repeated to improve the camera images.

* * * * *